US012597301B2

(12) United States Patent
Lee et al.

(10) Patent No.: US 12,597,301 B2
(45) Date of Patent: Apr. 7, 2026

(54) VEHICLE SENSOR CLEANING APPARATUS AND CONTROL METHOD THEREOF

(71) Applicants: DY AUTO CORPORATION, Chungcheongnam-do (KR); DY-ESSYS CORP., Incheon (KR)

(72) Inventors: Jong Wook Lee, Chungcheongnam-do (KR); Sin Won Kang, Chungcheongnam-do (KR); Min Wook Park, Incheon (KR); Sun Ju Kim, Incheon (KR); Tae Seong Roh, Incheon (KR)

(73) Assignees: DY-ESSYS CORP (KR); DY AUTO CORPORATION (KR)

( * ) Notice: Subject to any disclaimer, the term of this patent is extended or adjusted under 35 U.S.C. 154(b) by 86 days.

(21) Appl. No.: 18/586,156

(22) Filed: Feb. 23, 2024

(65) Prior Publication Data

US 2024/0412570 A1 Dec. 12, 2024

(30) Foreign Application Priority Data

Jun. 8, 2023 (KR) ........................ 10-2023-0073728

(51) Int. Cl.
B60S 1/54 (2006.01)
G07C 5/08 (2006.01)

(52) U.S. Cl.
CPC .............. G07C 5/0808 (2013.01); B60S 1/54 (2013.01)

(58) Field of Classification Search
CPC .... B60S 1/54; B60S 1/56; B60S 1/48; G01M 3/3263; G07C 5/08
See application file for complete search history.

(56) References Cited

U.S. PATENT DOCUMENTS

| | | | |
|---|---|---|---|
| 2015/0078940 A1* | 3/2015 | Kikuta | F04B 17/03 |
| | | | 417/443 |
| 2019/0061698 A1* | 2/2019 | Mizuno | B60S 1/0848 |
| 2024/0025377 A1* | 1/2024 | Kim | B60S 1/56 |
| 2025/0214542 A1* | 7/2025 | Von der Beeke | B60S 1/50 |

FOREIGN PATENT DOCUMENTS

| | | |
|---|---|---|
| KR | 1998-0078682 A | 11/1996 |
| KR | 1998-0019848 A | 6/1998 |
| KR | 10-2004-0026491 A | 3/2004 |
| KR | 10-2014-0129717 A | 11/2014 |
| KR | 10-2020-0050153 A | 5/2020 |
| KR | 10-2023-0079563 A | 6/2023 |

* cited by examiner

*Primary Examiner* — Tan Q Nguyen
(74) *Attorney, Agent, or Firm* — Klarquist Sparkman, LLP

(57) ABSTRACT

A vehicle sensor cleaning apparatus and a control method of the vehicle sensor cleaning apparatus are disclosed. The vehicle sensor cleaning apparatus includes at least one compressor configured to compress and store air in an air tank, a plurality of air nozzles configured to spray the air stored in the air tank to a plurality of sensors located in a vehicle, at least one air distributor configured to distribute the air stored in the air tank to the plurality of air nozzles through an air hose, and an air controller configured to control the at least one compressor and the at least one air distributor. The air controller is further configured to determine whether there is air leakage based on a pressure value of the air tank and/or the air hose when spraying air, a pressure value of the air tank and/or the air hose when filling the air tank with air, or a pressure value of the air distributor.

11 Claims, 11 Drawing Sheets

VEHICLE SENSOR CLEANING APPARATUS AND CONTROL METHOD THEREOF

CROSS-REFERENCE TO RELATED APPLICATION

This application is based on and claims priority under 35 U.S.C. § 119 to Korean Patent Application No. 10-2023-0073728, filed on Jun. 8, 2023, in the Korean Intellectual Property Office, the disclosure of which is incorporated by reference herein in its entirety.

BACKGROUND

1. Field

The disclosure relates to a vehicle sensor cleaning apparatus for cleaning a sensor installed on a vehicle and a control method thereof.

2. Description of the Related Art

Recent vehicles include various types of sensors (cameras, radars, LiDars, etc.) A vehicle sensor may not work normally when a foreign object is on a surface of the vehicle sensor. When the sensors necessary for autonomous driving or various driving assistance do not work normally, this can also affect the safety of vehicle operation. Although a system that emits air or washer fluid to remove foreign materials has been used, it is difficult to employ the air or washer fluid emitting system to clean small sensors located in various parts of a vehicle. In addition, when air leakage occurs, the strength of the air output to the sensors becomes weak, reducing a cleaning effect.

SUMMARY

The disclosure provides a vehicle sensor cleaning apparatus that detects air leakage and removes, with accurate air intensity, foreign materials on a surface of a sensor included in a vehicle, and a control method of the vehicle sensor clearing apparatus.

Additional aspects will be set forth in part in the description which follows and, in part, will be apparent from the description, or may be learned by practice of the presented embodiments of the disclosure.

According to an embodiment, a vehicle sensor cleaning apparatus includes at least one compressor configured to compress and store air in an air tank, a plurality of air nozzles configured to spray the air stored in the air tank to a plurality of sensors located in a vehicle, at least one air distributor configured to distribute the air stored in the air tank to the plurality of air nozzles through an air hose, and an air controller configured to control the at least one compressor and the at least one air distributor, wherein the air controller is further configured to determine whether there is air leakage based on a pressure value of the air tank and/or the air hose when spraying air, a pressure value of the air tank and/or the air hose when filling the air tank with air, or a pressure value of the air distributor.

According to an embodiment, a control method of a vehicle sensor cleaning apparatus includes determining a measured pressure value of an air tank and/or air hose each time air stored in the air tank is sprayed; determining whether there is air leakage based on a difference between an initial pressure value at startup and the measured pressure value; and compensating for and controlling an output intensity of the air when it is determined that there is the air leakage.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
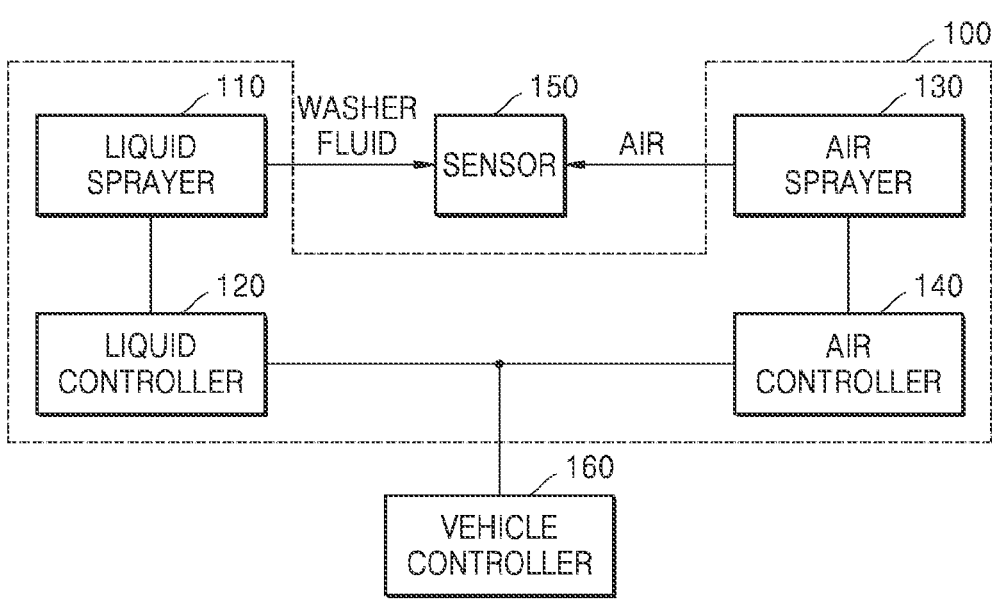
FIG. 1 is a view illustrating an example of an overall structure of a vehicle sensor cleaning apparatus according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, a vehicle sensor cleaning apparatus and a control method of the vehicle sensor cleaning apparatus, according to an embodiment, will be described in detail with reference to the accompanying drawings.

FIG. 1 is a view illustrating an example of an overall structure of a vehicle sensor cleaning apparatus according to an embodiment.

Referring to FIG. 1, a vehicle sensor cleaning apparatus 100 may include a liquid sprayer 110, a liquid controller 120, an air sprayer 130, and an air controller 140. The vehicle sensor cleaning apparatus 100 may be connected to a vehicle controller 160. In some embodiments, the vehicle sensor cleaning apparatus 100 may further include a gateway (not shown) that transmits a cleaning request of the vehicle controller 160 to each of the liquid controller 120 and the air controller 140. Each of the liquid controller 120 and the air controller 140 may be implemented with a micro controller unit (MCU) or the like.

The liquid sprayer 110 may spray washer fluid on a sensor 150. The washer fluid may include various components according to an embodiment. For example, the washer fluid may include various components such as general water or components identical to those used in a vehicle glass.

Figure 3:
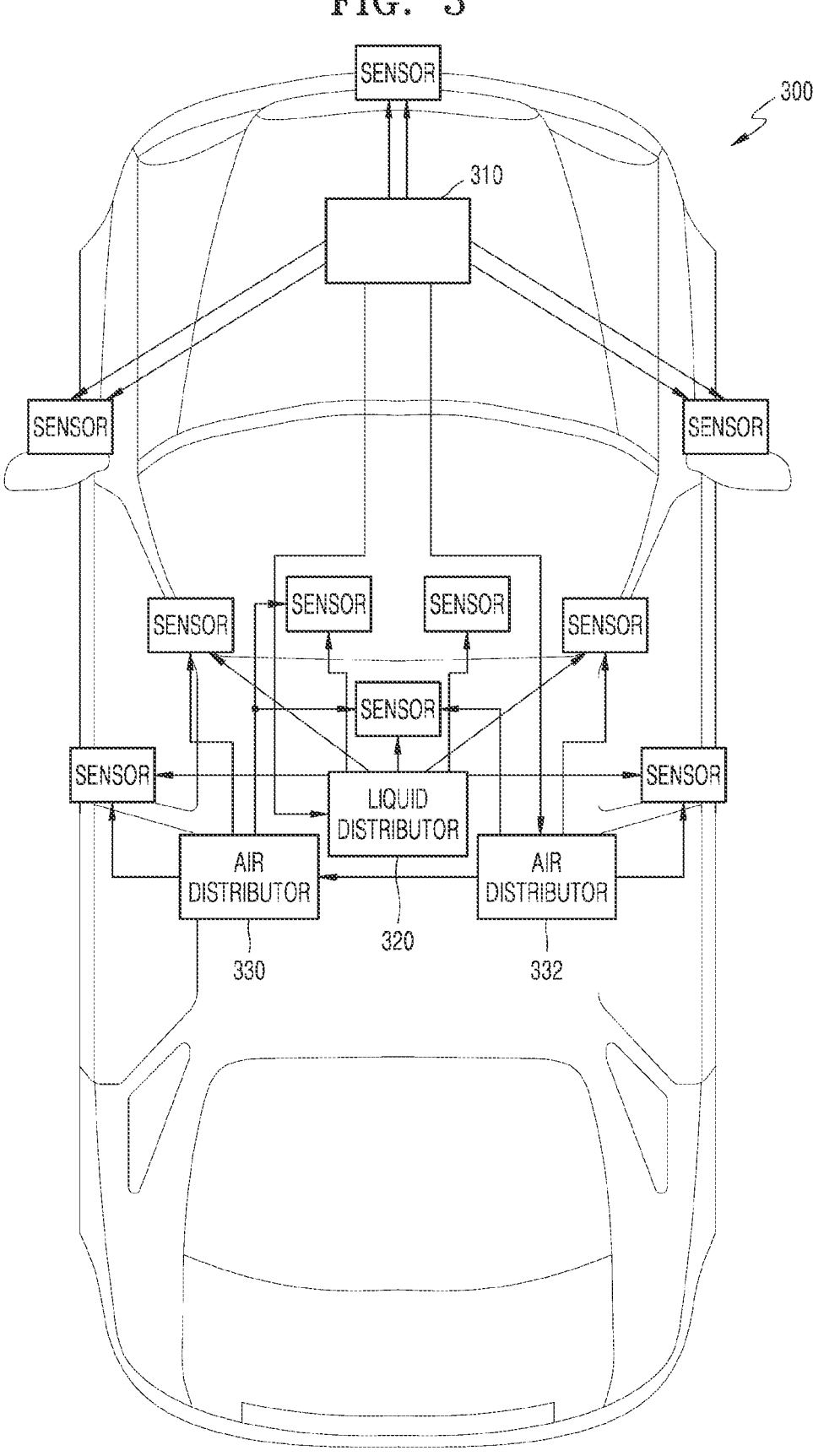
FIG. 3 is a view illustrating an example of a vehicle in which a vehicle sensor cleaning apparatus is implemented, according to an embodiment.
Figure 6:
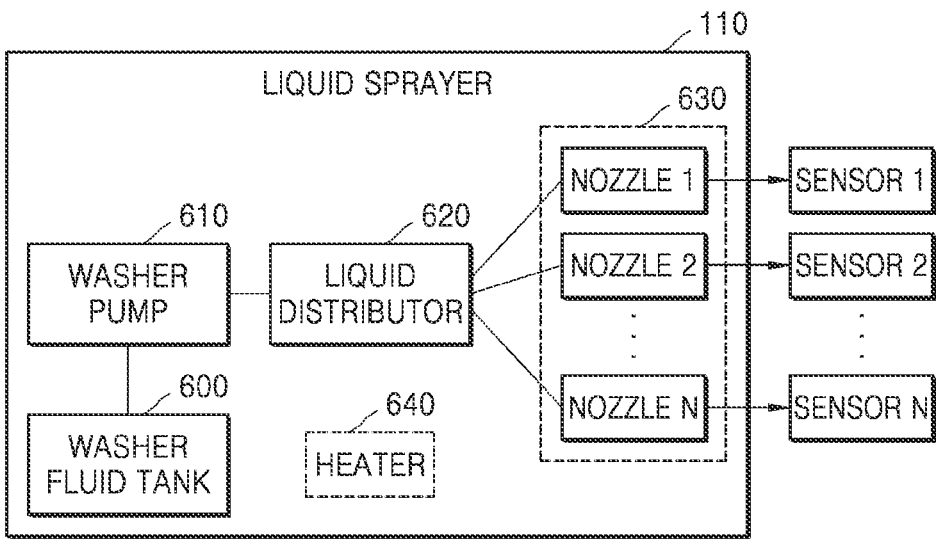
FIG. 6 is a view illustrating an example of a detailed structure of a liquid sprayer, according to an embodiment.

The present embodiment shows only one sensor 150 for convenience of explanation, but a vehicle may include a plurality of sensors as shown in FIG. 3. The liquid sprayer 110 may spray washer fluids simultaneously or sequentially on a plurality of sensors, or spray washer fluids only on sensors that require cleaning, and, in this regard, an example of a configuration of the liquid sprayer 110 is shown in FIG. 6.

The liquid controller 120 may control the washer fluid spraying of the liquid sprayer 110. For example, when the liquid controller 120 receives a cleaning request from the vehicle controller 160, the liquid controller 120 may control the liquid sprayer 110 to spray the washer fluid. When there is a cleaning request signal for a plurality of sensors, washer fluid spraying may be sequentially or simultaneously performed.

Figure 5:
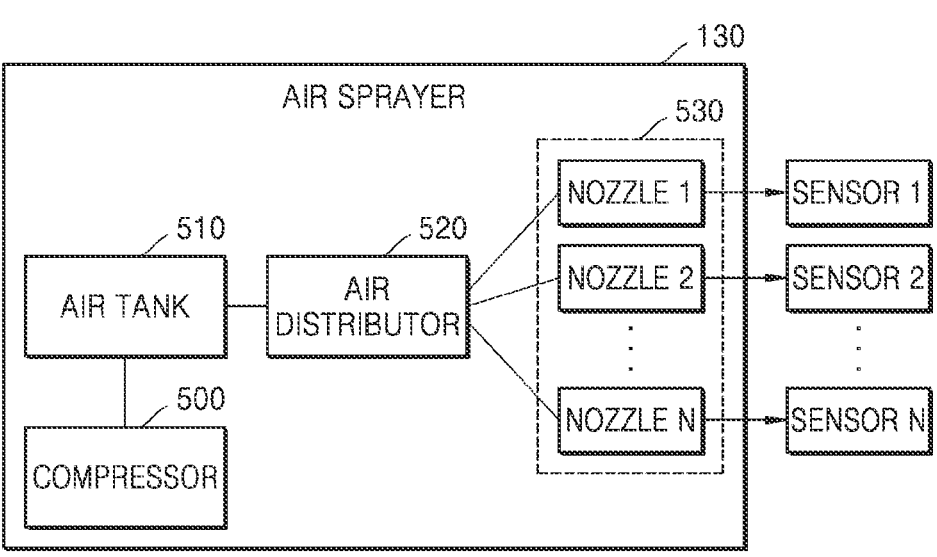
FIG. 5 is a view illustrating an example of a detailed structure of an air sprayer, according to an embodiment.

The air sprayer 130 may spray air on the sensor 150. Because there are a plurality of sensors in the vehicle, the air sprayer 130 may simultaneously or sequentially spray air on the plurality of sensors, or spray air only on sensors that require cleaning. An example of a configuration of the air sprayer 130 is shown in FIG. 5. Air sprayed on the sensor may be general air or compressed air. FIG. 5 is an example of spraying compressed air.

The air controller 140 may control the spraying of air of the air sprayer 130. For example, when the air controller 140 receives a cleaning request from the vehicle controller 160, the air controller 140 may control the air sprayer 130 to spray air.

The vehicle controller 160 may output a cleaning request command when the sensor 150 requires cleaning. For example, the vehicle controller 160 may identify a sensor that requires cleaning through various conventional methods. Because the method for the vehicle controller 160 to identify a sensor that requires cleaning is beyond the scope of the disclosure, descriptions thereof are omitted. The present embodiment is described assuming that the liquid controller 120 and the air controller 140 receive a cleaning request signal including sensor identification information from the vehicle controller 160.

The vehicle controller 160 may only output a cleaning request command and may not limit the cleaning method. Therefore, according to the cleaning request, the method of cleaning each sensor may be variously implemented. The present embodiment provides a method of performing cleaning through washer fluid spraying and air spraying when a cleaning request is received from the vehicle controller 160. For the sensor cleaning to be performed efficiently, the washer fluid spraying and the air spraying may be alternately performed. A method of controlling the spraying operations of the liquid sprayer 110 and the air sprayer 130 so as not to overlap each other will be described with reference to FIGS. 7 and 8.

In an embodiment, the vehicle sensor cleaning apparatus 100 may include the air sprayer 130 and the air controller 140, and the liquid sprayer 110 and the liquid controller 120 may be omitted. However, for convenience of explanation, hereinafter, the description will be made assuming that the vehicle sensor cleaning apparatus 100 includes the liquid sprayer 110 and the liquid controller 120 in addition to the air sprayer 130 and the air controller 140.

Figure 2:
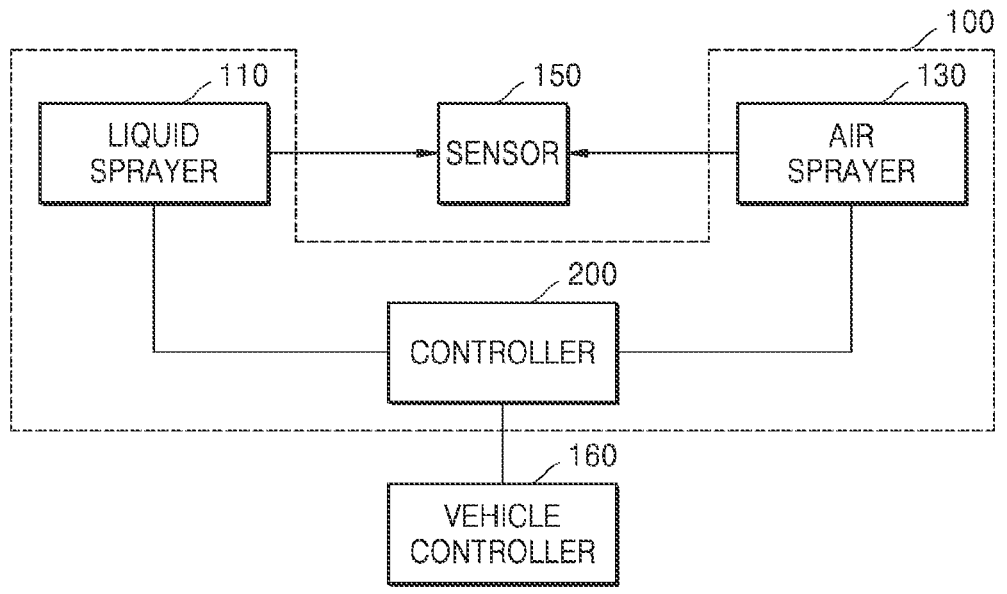
FIG. 2 is a view illustrating another example of the vehicle sensor cleaning apparatus according to an embodiment.

FIG. 2 is a view illustrating another example of the vehicle sensor cleaning apparatus according to an embodiment.

Referring to FIG. 2, a vehicle sensor cleaning apparatus 100 may include a liquid sprayer 110, an air sprayer 130, and a controller 200. The vehicle sensor cleaning apparatus 100 may be connected to a vehicle controller 160. Because the liquid sprayer 110, the air sprayer 130, the vehicle controller 160, and a sensor 150 of the present embodiment are the same as the configuration of FIG. 1, the descriptions corresponding thereto are omitted. As described above, the vehicle sensor cleaning apparatus 110 may be implemented with only the air sprayer 130 without the liquid sprayer 110.

The present embodiment may include the controller 200 in which the liquid controller 120 and the air controller 140 of FIG. 1 are integrated. When the controller 200 receives a cleaning request from the vehicle controller 160, the liquid sprayer 110 and the air sprayer 130 may be controlled to simultaneously or sequentially spray the washer fluid and air. Each configuration and function of the liquid controller 120 and the air controller 140 may be integrally implemented in the controller 200.

However, hereinafter, for convenience of explanation, descriptions will be made based on the configuration of FIG. 1. Therefore, the functions and configurations of the liquid controller 120 and the air controller 140, which will be discussed later, may be implemented with the controller 200 of FIG. 2.

FIG. 3 is a view illustrating an example of a vehicle in which the vehicle sensor cleaning apparatus is implemented, according to an embodiment.

Referring to FIG. 3, a plurality of sensors are provided in a vehicle 300. On one side 310 of the vehicle, some components of the liquid sprayer 110 and the air sprayer 130 (e.g., an air tank and a washer fluid tank of FIGS. 5 and 6) may be provided. The present embodiment shows a case in which the air tank and the washer fluid tank are arranged in one location, but this is only an example, and the air tank and the washer fluid tank may be arranged in different locations of the vehicle. In some embodiments, a plurality of air tanks and a plurality of washer fluid tanks may be provided.

A nozzle that sprays air or washer fluid may be arranged in each sensor. Air is sprayed on the sensor through the air nozzle of FIG. 5, and the washer fluid is sprayed on the sensor through the liquid nozzle of FIG. 6.

One or more air distributors 330 and 332 may be provided for supplying compressed air of the air tank to the air nozzle arranged in each sensor. The air controller 140 may spray air on a desired sensor by controlling the air distributor 330 and 332.

One or more liquid distributors 320 may be provided for supplying the washer fluid of the washer fluid tank to the liquid nozzle arranged in each sensor. The liquid controller 120 may spray the washer fluid on a desired sensor by controlling the liquid distributor 320.

Figure 4:
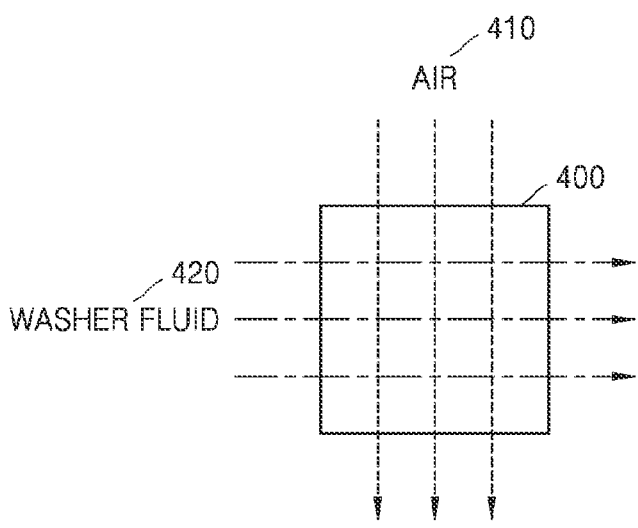
FIG. 4 is a view illustrating an example of a cleaning direction of a sensor, according to an embodiment.
Figure 4:
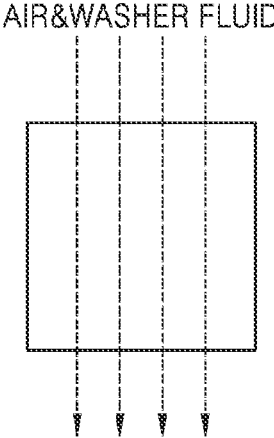
Figure 4:
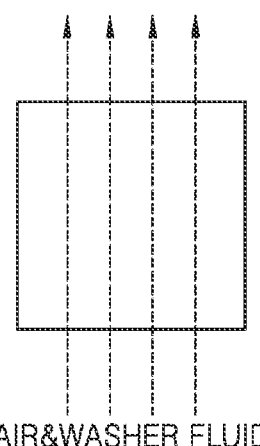

FIG. 4 is a view illustrating an example of a cleaning direction of a sensor, according to an embodiment.

Referring to FIG. 4, a direction 420 of a washer fluid sprayed on the surface of a sensor 400 and a direction 410 of air sprayed on the surface of the sensor 400 may be different from each other. In addition, the washer fluid and the air may be simultaneously or sequentially sprayed, or only one of the washer fluid and the air may be sprayed. For example, the liquid sprayer 110 may spray the washer fluid from the left to the right on the sensor 400, and the air sprayer 130 may spray the air from the top to the bottom of the sensor 400. The washer fluid and air sprayed in different directions may effectively remove foreign materials on the surface of the sensor 400. For example, air may be sprayed from the top to the bottom to remove the washer fluid or rainwater left on the surface of the sensor 400.

In another embodiment, the direction 420 of the washer fluid sprayed on the surface of the sensor 400 and the direction 410 of the air may be the same. For example, the washer fluid and the air may be sprayed from the top to the bottom (or from the bottom to the top) of the sensor 400. Through the simultaneous spraying of the washer fluid and air, the pressure on the surface of the sensor may be increased to effectively remove foreign materials on the surface. In addition, the direction and order of spraying the washer fluid and the air may vary depending on embodiments.

FIG. 5 is a view illustrating an example of a detailed structure of an air sprayer, according to an embodiment.

Referring to FIG. 5, an air sprayer 130 may include a compressor 500, an air tank 510, an air distributor 520, and a plurality of nozzles 530.

The compressor 500 may compress and stores air in the air tank 510. In an embodiment, the compressor 500 may include a plurality of motors. In this case, the compressor 500 may alternately use a plurality of motors to prevent a load from being added to one motor. A compressor 500 including one motor may be implemented. In another embodiment, a compression intensity of air stored in the air tank 510 may be adjusted through the compressor 500.

The air tank 510 may store the compressed air. In an embodiment, air may be sprayed on the sensor by using a propeller, etc. without the compressor 500 and the air tank 510. However, since the intensity of air generated through the propeller, etc. is weak, it is difficult to cleanly remove foreign materials or water on the surface of the sensor. Therefore, the present embodiment may increase the intensity (e.g., the speed) of air sprayed on the sensor by using compressed air stored in the air tank 510.

The air distributor 520 may distribute compressed air output from the air tank 510 to the plurality of nozzles 530 through an air hose. The nozzles 530 may be respectively arranged in the sensors and spray air on the sensors. In an example, the air distributor 520 may include a plurality of channels that output compressed air, and the channels are respectively connected to the nozzles 530 through air hoses. When the number of sensors is greater than the number of channels of the air distributor 520, a plurality of air distributors 520 may be provided. For example, the plurality of air distributors 520 may each be connected in parallel to the air tank 510, or the plurality of air distributors 520 may be connected to each other in a hierarchical structure such as a tree structure.

The air distributor 520 may turn on/off each channel under the control of the air controller 140. For example, when the air distributor 520 receives an on command of a first channel from the air controller 140, the air distributor 520 may output compressed air of the air tank 510 through the first channel, and a first nozzle connected to the first channel through an air hose may spray air on a first sensor. The on/off of the channel may be controlled through a solenoid valve, etc.

To control the performance of the air distributor 520 of turning each channel on/off, the air controller 140 may identify and store, in advance, which channel of the air distributor 520 each sensor is connected to. For example, if a relationship between first sensor identification information and the first channel is defined, when cleaning of the first sensor is required, the air controller 140 may transmit the on command of the first channel of the air distributor 520 to the air distributor 520.

FIG. 6 is a view illustrating an example of a detailed structure of a liquid sprayer, according to an embodiment.

Referring to FIG. 6, a liquid sprayer 110 may include a washer fluid tank 600, a washer pump 610, a liquid distributor 620, and at least one nozzle 630.

The washer fluid tank 600 may store the washer fluid. The washer pump 610 may output the washer fluid stored in the washer fluid tank 600 to the liquid distributor 620. The liquid distributor 620 may output the washer fluid received through the washer pump 610 through the nozzle 630. The washer pump 610 may output the washer fluid through motor driving. The nozzle 630 may spray the washer fluid on the sensor. Each nozzle 630 may be connected to the liquid distributor 620 through a liquid hose. In an embodiment, the nozzle 630 may protrude when the washer fluid is sprayed on the sensor and then retract back in when spraying is completed.

In another embodiment, there may be a plurality of washer pumps 610. For example, when there are 20 nozzles, 1st to 10th nozzles may be connected to a first washer pump (or a first motor), 11th to 14th nozzles may be connected to a second washer pump (or a second motor), and 15th to 20th nozzles may be connected to a third washer pump (or a third motor). The liquid controller 120 may control a plurality of washer pumps (or a plurality of motors) in parallel.

The liquid distributor 620 may select the nozzle 630 to output the washer fluid according to the control of the liquid controller 120. In an example, the liquid distributor 620 may include a plurality of channels that output the washer fluid, and the channels are respectively connected to the nozzles 630 through liquid hoses. When the number of sensors becomes greater than the number of channels of the liquid distributor 620, a plurality of liquid distributors 620 may be provided. For example, the plurality of liquid distributors 620 may each be connected in parallel to the washer pump 610, or the plurality of liquid distributors 620 may be connected to each other in a hierarchical structure such as a tree structure.

The liquid distributor 620 may spray the washer fluid on the desired sensor by turning on/off the plurality of channels. When the liquid distributor 620 receives the on command of the first channel from the liquid controller 120, the washer fluid is output through the first channel, and the first nozzle connected to the first channel may spray the washer fluid on the first sensor. The liquid controller 120 may identify and store in advance which channel of the liquid distributor 620 each sensor is connected to, like the air controller 140 described above. For example, if a relationship between the first sensor identification information and the first channel is defined in advance, when cleaning of the first sensor is required, the liquid controller 120 may transmit the on command of the first channel of the liquid distributor 620 to the liquid distributor 620. In an embodiment, each channel connected to each nozzle may be turned on/off through a solenoid valve.

In some embodiments, the liquid sprayer 110 may further include a heater 640. The heater 640 may supply heat to the liquid hose connecting each nozzle 630 to the liquid distributor 620, the washer pump 610, the washer fluid tank 600, or the liquid distributor 620. For example, when the external temperature is low, such as in winter, etc., the washer fluid in the liquid hose or liquid distributor 620 may freeze, and thus, the heater 640 may prevent the washer fluid from being frozen. In an embodiment, the liquid controller 120 may operate the heater 640 when the liquid controller 120 receives a command to operate the heater 640 or when an external temperature detected through a temperature sensor is less than a preset temperature.

Figure 7:
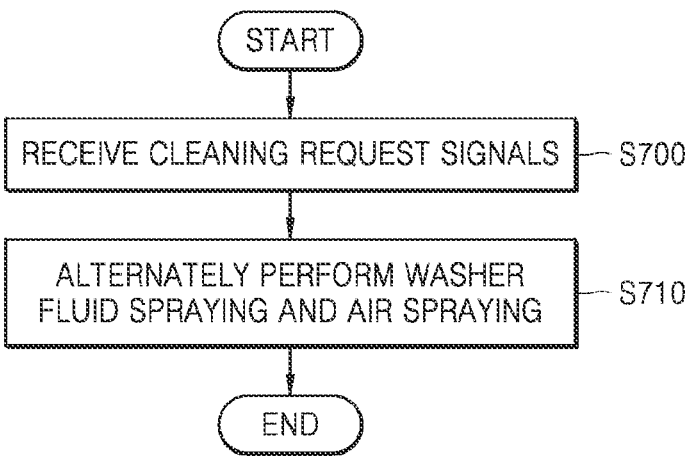
FIGS. 7 and 8 are views illustrating an example of an alternating control method of a vehicle sensor cleaning apparatus, according to an embodiment.
Figure 8:
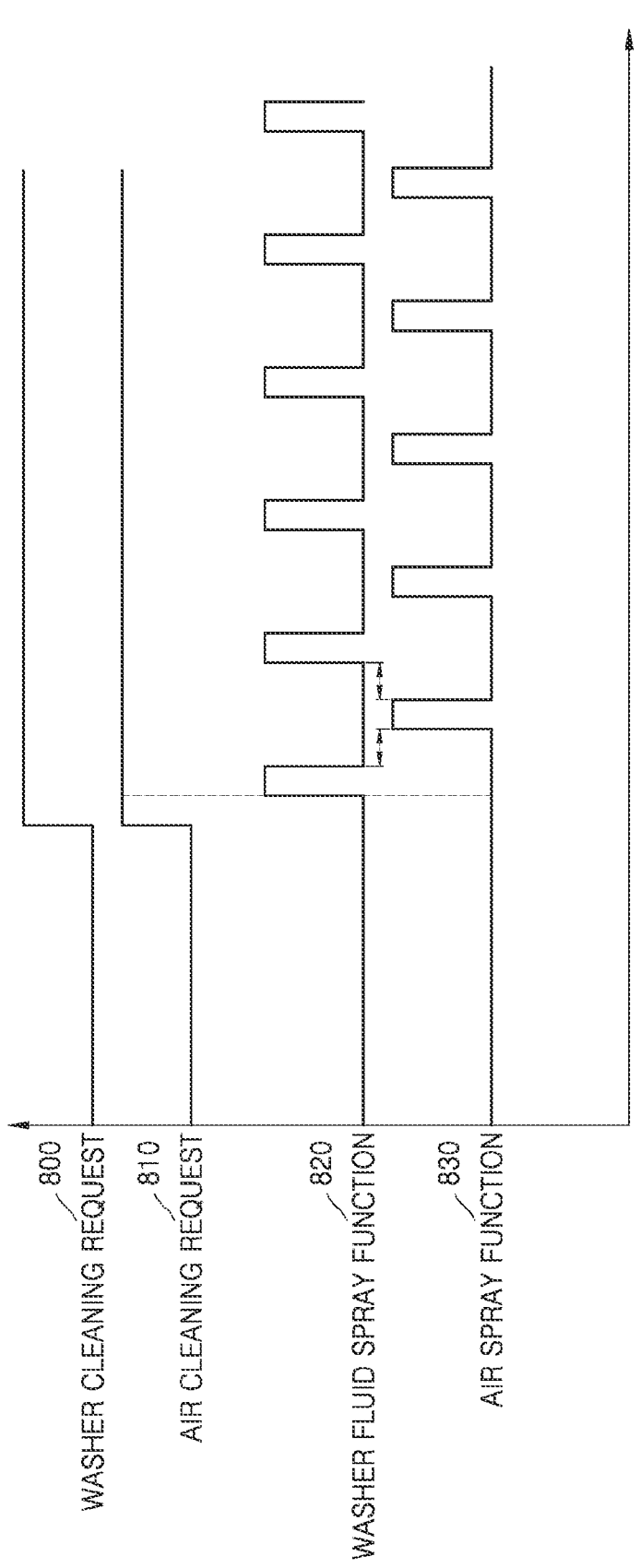

FIGS. 7 and 8 are views illustrating an example of an alternating control method of a vehicle sensor cleaning apparatus, according to an embodiment.

Referring to FIGS. 7 and 8, the liquid controller 120 and the air controller 140 may receive cleaning request signals 800 and 810 from the vehicle controller 160 (S700). The liquid controller 120 and the air controller 140 may be connected to the vehicle controller 160 via Controller Area Network (CAN) or CAN with Flexible Data Rat (CAN FD).

The liquid controller 120 and the air controller 140 may set a washer fluid spraying control start point and an air spraying control start point to be different from each other to allow washer fluid and air to be alternately sprayed (S710). For example, the liquid controller 120 and the air controller 140 may control washer fluid spraying and air spraying to be alternately performed for the same sensor.

An alternating control method for the same sensor may be implemented in various ways.

In an embodiment, when the liquid controller 120 receives a cleaning request signal (i.e., a washer cleaning request 800), the liquid controller 120 may convert the mode to a liquid spray mode, in which washer fluid is sprayed on a sensor corresponding to the cleaning request signal (i.e., the washer cleaning request 800), and inform the air controller 140 of the on state of the liquid spray mode. The liquid controller 120 may be connected to the air controller 140, and the air controller 140 may not perform air spraying when receiving the on state of the liquid spray mode. If air is being sprayed when the air controller 140 receives the on status of the liquid spray mode, the air controller 140 may immediately stop spraying air. When the air controller 140 confirms that the liquid spray mode is in an off state through the liquid controller 120, the air controller 140 may perform air spraying according to a cleaning request signal (i.e., an air cleaning request 810). The air controller 140 may request and receive the status of the liquid spray mode from the liquid controller 120 at regular intervals, or the liquid controller 120 may send status information to the air controller 140 whenever the status of the liquid spray mode changes. In addition, the liquid controller 120 and the air controller 140 may share the state of the liquid spray mode through various methods.

In another embodiment, when the washer cleaning request 800 and the air cleaning request 810 simultaneously occur, the liquid controller 120 may immediately output a control signal 820 for washer fluid spraying according to the washer cleaning request 800. When the air controller 140 receives the air cleaning request 810, the air controller 140 may output a control signal 830 for air spraying after a predefined period of time has elapsed. That is, there is a certain time interval between the start point of a washer fluid spraying operation and the start point of an air spraying operation. For example, the liquid controller 120 may control the liquid sprayer 110 to spray washer fluid for a time t1 after receiving the washer cleaning request 800, and the air controller 140 may control the air sprayer 130 to spray air after the time t1 has elapsed after receiving the air cleaning request 810.

In another embodiment, washer fluid spraying and air spraying may be controlled to be alternately performed repeatedly. The liquid controller 120 may repeat the washer fluid spraying operation at regular periodic intervals, and the air controller 140 may also repeat the air spraying operation at regular periodic intervals. For example, the liquid controller 120 and the air controller 140 may repeat an on signal for the spraying operation at regular intervals. During an on signal period, washer fluid spraying or air spraying may be performed, and during an off signal period, a washer fluid or air spraying operation may not be performed. When the washer fluid spraying operation timing and the air spraying operation timing are different from each other, the cycles of the two operations are the same, and the on signal period for washer fluid spraying and the on signal period for air spraying do not overlap each other, the washer spraying operation and the air spraying operation may not overlap and alternate with each other.

Figure 9:
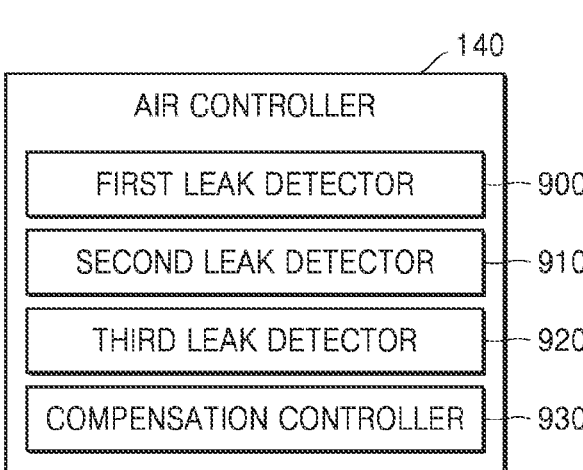
FIG. 9 is a view illustrating a configuration of an example of an air controller according to an embodiment.

FIG. 9 is a view illustrating a configuration of an example of an air controller according to an embodiment.

Referring to FIG. 9, the air controller 140 may include a first leak detector 900, a second leak detector 910, a third leak detector 920, and a compensation controller 930. According to an embodiment, the air controller 140 may include at least one of the first leak detector 900, the second leak detector 910, and the third leak detector 920. However, for convenience of explanation, the following description will be made assuming that all of the first to third leak detectors 900, 910, and 920 are included in the air controller 140.

The first air leak detector 900 may detect air leakage at the time of spraying. The first leak detector 900 may detect air leakage based on the difference between an initial pressure value of an air tank determined when starting a vehicle and a pressure value (i.e., a measured pressure value) of the air tank and/or an air hose determined each time of spraying. A pressure sensor to determine pressure may be located in the air tank and/or air hose. In addition to this, various methods of measuring pressure may be applied to the present embodiment.

In an embodiment, the first leak detector 900 may store the difference between the initial pressure value and the measured pressure value for a predefined number of sprayings (e.g., 60 times). The first leak detector 900 may determine that there is leakage when the difference in pressure value is outside a predefined normal range. For example, the first leak detector 900 may determine a minor malfunction when the difference in pressure value is outside a predefined first range, and may determine a major malfunction when the difference in pressure value is outside a second range (>the first range). In another embodiment, when a predefined number of sprayings is reached, the air controller 140 may control the air tank to be filled with air.

The second leak detector 910 may determine air leakage at the time of filling. The second leak detector 910 may determine that there is leakage when the difference between the most recently measured pressure value of the air tank and a measured pressure value of the air tank at the time of filling is outside a predefined range. In an embodiment, the second leak detector 910 may determine a minor malfunction when the difference between the most recently measured pressure value and the measured pressure value at the time of filling is outside a first range, and may determine a major malfunction when the difference is outside a second range (>the first range). The first and second ranges for the first leak detector 900 to distinguish between a major malfunction and a minor malfunction may be the same as or different from the first and second ranges for the second leak detector 910 to distinguish between a major malfunction and a minor malfunction.

The third air leak detector 920 may detect air leakage in multiple channels. The third leak detector 920 may determine that there is leakage when a maximum pressure value of at least one air distributor when spraying is performed and/or a maximum pressure value thereof when the spraying is off is outside a predefined normal range. The pressure of the at least one air distributor may be determined through various existing methods, such as a pressure sensor. For example, the third leak detector 920 may determine there is a minor malfunction when the maximum pressure value of the air distributor is outside a first normal range when spraying is performed or when the spraying is off, and may determine that there is a major malfunction when the maximum pressure value of the air distributor is outside a second normal range (>the first normal range) when the spraying is performed or when the spraying is off.

When it is determined that there is air leakage, the compensation controller 930 may compensate for and control the output intensity of the air. For example, when a measured pressure value during spraying is lower than an initial pressure value determined by the first leak detector 900, the compensation controller 930 may increase the pressure intensity of the air stored in the air tank through a compressor. In addition, the compensation controller 930 may adjust the intensity of compressed air in the air tank according to a pressure value difference determined by the second leak detector 910 and/or the third leak detector 920.

Air leakage may occur in various locations, such as an air hose or an air distributor. For example, when there are a plurality of air distributors, a first air distributor may be normal, but air leakage may occur in a second air distributor. In this case, when cleaning is performed through an air nozzle connected to the second air distributor, the air controller 140 may compensate for and control the pressure of the air tank. That is, compensation control of the air pressure of the air tank may be selectively performed depending on whether air leakage has occurred.

In another embodiment, when the first to third leak detectors 900, 910, and 920 classify the state of air leakage into a plurality of stages, such as a minor malfunction and a major malfunction, the compensation controller 930 may perform a control method for each stage. For example, when there is a minor malfunction, the compensation controller 930 may perform control to compensate for the intensity of air spraying, and when there is a major malfunction, the compensation controller 930 may stop without performing air spraying even when there is a request for cleaning.

In another embodiment, the first to third leak detectors 900, 910, and 920 may determine that there is air leakage when a measured pressure value measured for a certain period of time is less than a reference pressure value. For example, when the length of a time period in which the measured pressure value deviates from the reference pressure value continues for a predefined time, it may be determined that there is air leakage. Alternatively, when the number of times the measured pressure value deviates from the range of the reference pressure value is equal to or greater than a reference number of times within a predefined time period, it may be determined that there is air leakage. The same may apply to the following embodiments.

Figure 10:
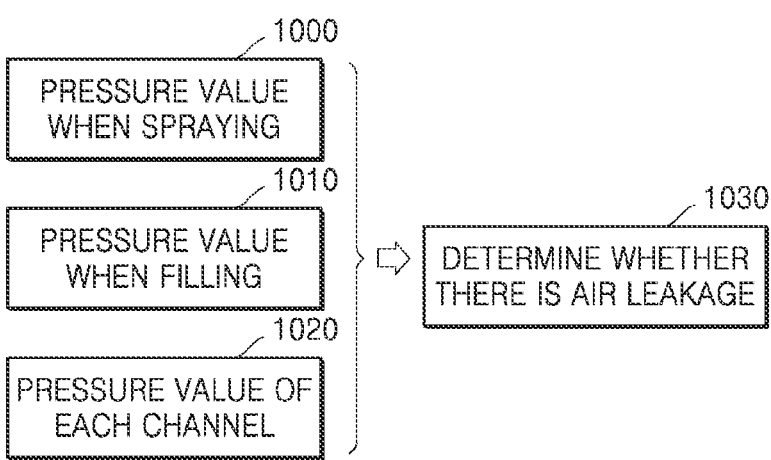
FIG. 10 is a view illustrating an example of an air leakage determination method according to an embodiment.

FIG. 10 is a view illustrating an example of an air leakage determination method according to an embodiment.

Referring to FIG. 10, the air controller 140 may determine whether there is air leakage (1030) by using at least one of a pressure value 1000 of an air tank and/or air hose when spraying air, a pressure value 1010 of the air tank (or air hose) when filling the air tank with air, and a pressure value 1020 of each of multiple channels (e.g., each distributor).

The air controller 140 may preset a reference range for determining air leakage for each of the pressure values 1000, 1010, and 1020. In another embodiment, the air controller 140 may determine air leakage by considering the difference between each of the pressure values 1000, 1010, and 1020 and a predefined reference range. In another embodiment, the air controller 140 may determine which of the plurality of pressure values 1000, 1010, and 1020 is outside a normal range to determine a location where air leakage has occurred. For example, when the pressure value 1000 during spraying is outside the normal range, the air controller 140 may determine that air leakage has occurred in a component (e.g., an air distributor or air hose) for spraying. When the pressure value 1010 during filling is outside the normal range, the air controller 140 may determine that air leakage has occurred in a component for filling the air tank, such as a compressor. Alternatively, when the pressure value 1020 for each channel is identified, the air controller 140 may determine which air distributor and/or air hose the air leakage has occurred in.

Figure 11:
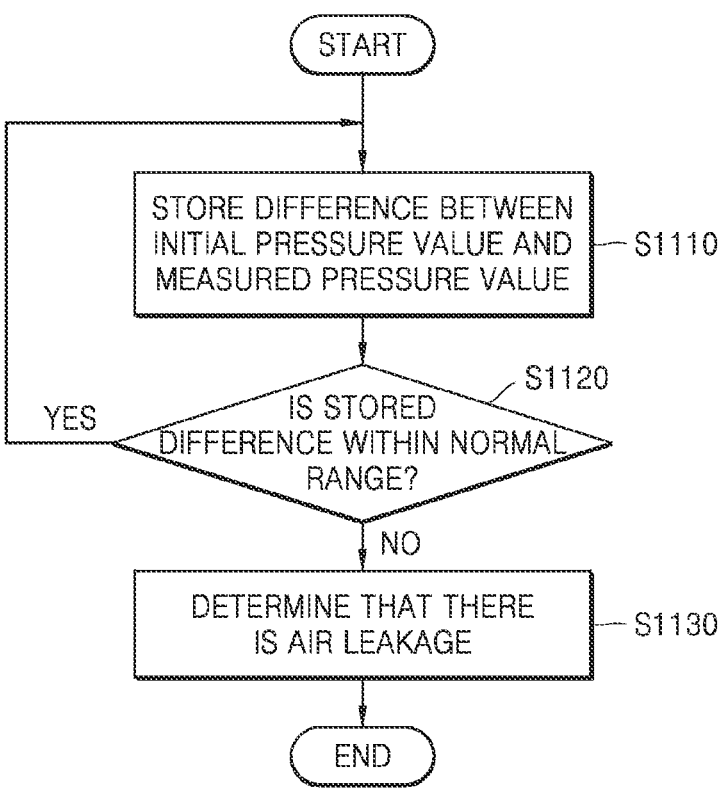
FIG. 11 is a flowchart illustrating an example of a method of determining air leakage during spraying, according to an embodiment.

FIG. 11 is a flowchart illustrating an example of a method of determining air leakage during spraying, according to an embodiment.

Referring to FIG. 11, the air controller 140 may determine and store the difference between a pressure value (i.e., an initial pressure value) of an air tank at the time of starting a vehicle and a pressure value (i.e., a measured pressure value) of the air tank or air hose measured at each spraying (S1100). When the difference between the initial pressure value and the measured pressure value is outside a predefined normal range (S1120), the air controller 140 may determine that there is air leakage (S1130). The air controller 140 may accumulate and store the difference between the pressure values for a certain number of sprayings. When a certain number of sprayings elapses, the air controller 140 may control the air tank to be filled with air.

Figure 12:
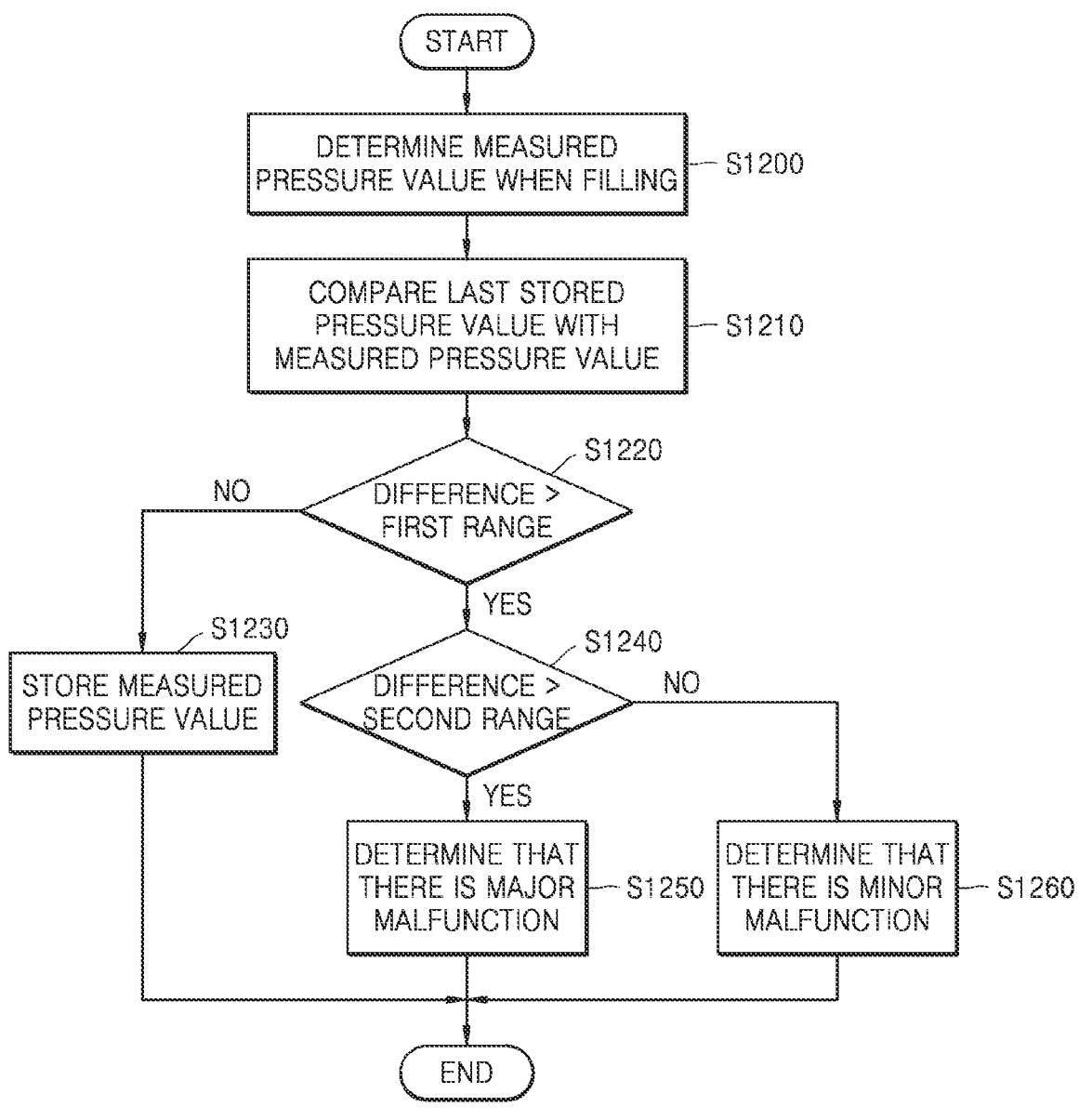
FIG. 12 is a flowchart illustrating an example of a method of determining air leakage during filling, according to an embodiment.

FIG. 12 is a flowchart illustrating an example of a method of determining air leakage during filling, according to an embodiment.

Referring to FIG. 12, the air controller 140 may determine a pressure value of the air tank most recently measured before the filling time (S1200). For example, a measured pressure value last identified and stored in the method described with reference to FIG. 11 may be determined as the most recent measured pressure value.

The air controller 140 may compare the last stored measured pressure value with a measured pressure value of the air tank at the time of filling (S1210). The air controller 140 may store the two measured pressure values and the difference therebetween (S1230). When the difference between the two pressure values is outside a first range (S1220), the air controller 140 may determine that there is a minor malfunction due to air leakage (S1260). When the difference between the two pressure values is outside a second range (S1240), the air controller 140 may determine that there is a major malfunction due to air leakage (S1250).

Figure 13:
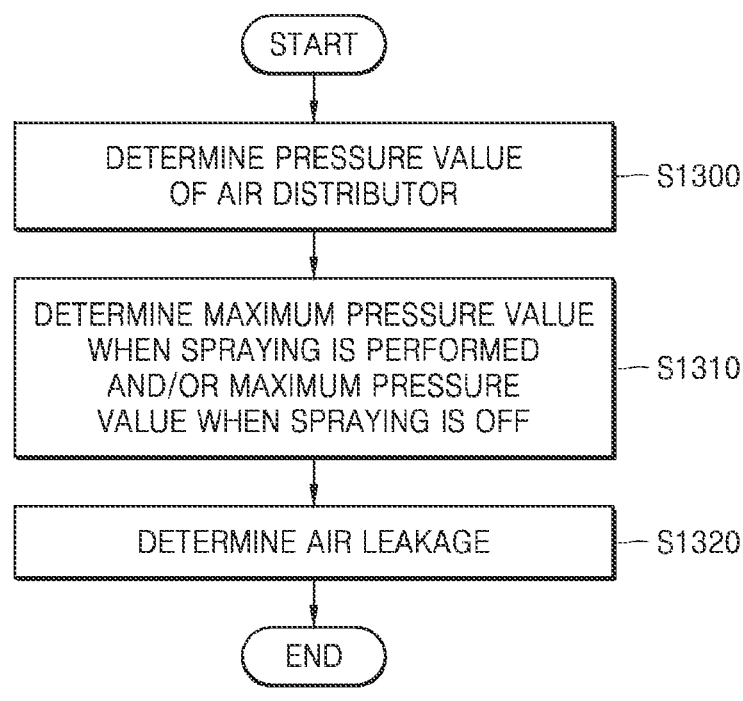
FIG. 13 is a flowchart illustrating an example of a method of determining air leakage for multiple channels, according to an embodiment.

FIG. 13 is a flowchart illustrating an example of a method of determining air leakage for multiple channels, according to an embodiment.

Referring to FIG. 13, the air controller 140 may determine a pressure value of at least one air distributor (S1300). The air controller 140 may determine air leakage by comparing a maximum pressure value of the air distributor when spraying is performed and/or a maximum pressure value of the air distributor when spraying is off with a predefined normal range (S1310 and S1320).

Figure 14:
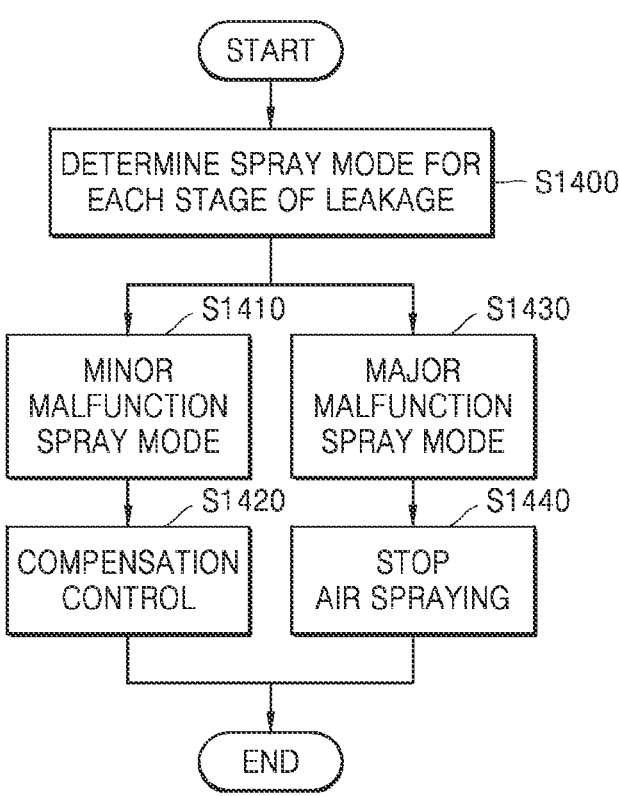
FIG. 14 is a view illustrating an example of a control method for each stage of air leakage, according to an embodiment.

FIG. 14 is a view illustrating an example of a control method for each stage of air leakage, according to an embodiment.

Referring to FIG. 14, the air controller 140 may determine air leakage by dividing the air leakage into a plurality of stages (S1400). For example, the air controller 140 may determine air leakage by dividing the air leakage into a minor malfunction and a major malfunction.

When the air leakage is a minor malfunction, the air controller 140 may operate in a minor malfunction spray mode (S1410), and when the air leakage is a major malfunction, the air controller 140 may operate in a major malfunction spray mode (S1430). In the case of the minor malfunction-spraying mode, the air controller 140 may perform compensation control to increase the pressure of the air tank by the intensity of leaked air and output the air of the increased pressure (S1420). In the case of the major malfunction-spraying mode, the air controller 140 may stop air spraying (S1440).

The disclosure may also be implemented as a computer-readable program code on a computer-readable record medium. The computer-readable recording medium may include every type of recording device storing data readable by a computer system. Examples of the computer-readable recording media may include ROM, RAM, CD-ROM, magnetic tapes, floppy disks, optical data storage devices, etc. In addition, the computer-readable recording media may be distributed to a computer system connected by a network such that a computer-readable code may be stored and executed in a distributed method.

According to an embodiment, air leakage may be accurately detected. In another embodiment, the air intensity may be compensated and output depending on the degree of air leakage, or the air output may be stopped. With a constant air intensity, foreign materials on a surface of the sensor located in the vehicle may be removed. In another embodiment, washer fluid and air may be used together to cleanly remove foreign materials from a surface of the sensor.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A vehicle sensor cleaning apparatus comprising:
at least one compressor configured to compress and store air in an air tank;
a plurality of air nozzles configured to spray the air stored in the air tank to a plurality of sensors located in a vehicle;

at least one air distributor configured to distribute the air stored in the air tank to the plurality of air nozzles through an air hose; and
an air controller configured to control the at least one compressor and the at least one air distributor,
wherein the air controller is further configured to determine whether there is air leakage based on a pressure value of the air tank and/or the air hose when spraying air, a pressure value of the air tank and/or the air hose when filling the air tank with air, or a pressure value of the air distributor,
wherein the air controller comprises a first leak detector configured to detect air leakage based on a difference between an initial pressure value of the air tank determined when starting the vehicle and a measured pressure value of the air tank and/or the air hose determined each time of spraying.

2. The vehicle sensor cleaning apparatus of claim 1, wherein the first leak detector is further configured to store a predefined number of times the difference between the initial pressure value and the measured pressure value measured at each spraying and determine that there is leakage when the difference is outside a predefined normal range.

3. A vehicle sensor cleaning apparatus comprising:
at least one compressor configured to compress and store air in an air tank;
a plurality of air nozzles configured to spray the air stored in the air tank to a plurality of sensors located in a vehicle;
at least one air distributor configured to distribute the air stored in the air tank to the plurality of air nozzles through an air hose; and
an air controller configured to control the at least one compressor and the at least one air distributor,
wherein the air controller is further configured to determine whether there is air leakage based on a pressure value of the air tank and/or the air hose when spraying air, a pressure value of the air tank and/or the air hose when filling the air tank with air, or a pressure value of the air distributor
wherein the air controller comprises a second leak detector configured to determine that there is leakage when a difference between the most recently measured pressure value of the air tank and a measured pressure value of the air tank at a time of filling is outside a predefined range.

4. The vehicle sensor cleaning apparatus of claim 3, wherein the second leak detector is further configured to determine that there is a minor malfunction when the difference is outside a first range and determine that there is a major malfunction when the difference is outside a second range (>the first range).

5. A vehicle sensor cleaning apparatus comprising:
at least one compressor configured to compress and store air in an air tank;
a plurality of air nozzles configured to spray the air stored in the air tank to a plurality of sensors located in a vehicle;
at least one air distributor configured to distribute the air stored in the air tank to the plurality of air nozzles through an air hose; and
an air controller configured to control the at least one compressor and the at least one air distributor,
wherein the air controller is further configured to determine whether there is air leakage based on a pressure value of the air tank and/or the air hose when spraying air, a pressure value of the air tank and/or the air hose when filling the air tank with air, or a pressure value of the air distributor, wherein the air controller comprises a third leak detector configured to determine that there is leakage when a maximum pressure value of the at least one air distributor when spraying is performed or a maximum pressure value of the at least one air distributor when the spraying is off is outside a predefined normal range.

6. A vehicle sensor cleaning apparatus comprising:

at least one compressor configured to compress and store air in an air tank;

a plurality of air nozzles configured to spray the air stored in the air tank to a plurality of sensors located in a vehicle;

at least one air distributor configured to distribute the air stored in the air tank to the plurality of air nozzles through an air hose; and an air controller configured to control the at least one compressor and the at least one air distributor, wherein the air controller is further configured to determine whether there is air leakage based on a pressure value of the air tank and/or the air hose when spraying air, a pressure value of the air tank and/or the air hose when filling the air tank with air, or a pressure value of the air distributor, wherein the air controller comprises a compensation controller configured to compensate for and control an output intensity of the air when it is determined that there is air leakage.

7. The vehicle sensor cleaning apparatus of claim 6, wherein the air controller is further configured to classify a degree of the air leakage into a minor malfunction and a major malfunction, perform the compensation in case of the minor malfunction, and stop air spraying in case of the major malfunction.

8. A control method of a vehicle sensor cleaning apparatus, the control method comprising:

determining a measured pressure value of an air tank and/or air hose each time air stored in the air tank is sprayed;

determining whether there is air leakage based on a difference between an initial pressure value at startup and the measured pressure value; and compensating for and controlling an output intensity of the air when it is determined that there is the air leakage.

9. The control method of claim 8, further comprising determining whether there is air leakage based on a difference between the most recently measured pressure value each time the air tank is filled and a measured pressure value of the air tank and/or air hose at a time of filling.

10. The control method of claim 8, further comprising determining whether there is air leakage based on a maximum pressure value of at least one air distributor when spraying is performed and/or a maximum pressure value of the at least one air distributor when the spraying is off, the least one air distributor supplying the air from the air tank to a plurality of air nozzles that spray the air to a plurality of sensors located in a vehicle.

11. A computer-readable recording medium recording a computer program for performing the control method of claim 9.

* * * * *